(No Model.)

J. R. FLETCHER.
LOCKING DEVICE FOR SUSPENDING LINES.

No. 491,541. Patented Feb. 14, 1893.

WITNESSES

INVENTOR
John R. Fletcher.

ATTORNEY

UNITED STATES PATENT OFFICE.

JOHN R. FLETCHER, OF DAYTON, OHIO.

LOCKING DEVICE FOR SUSPENDING-LINES.

SPECIFICATION forming part of Letters Patent No. 491,541, dated February 14, 1893.

Application filed February 16, 1892. Serial No. 421,680. (No model.)

*To all whom it may concern:*

Be it known that I, JOHN R. FLETCHER, a citizen of the United States, residing at Dayton, in the county of Montgomery and State of Ohio, have invented a new and useful Improvement in Locking Devices for Suspending-Lines, of which the following is a specification.

Figure 1:
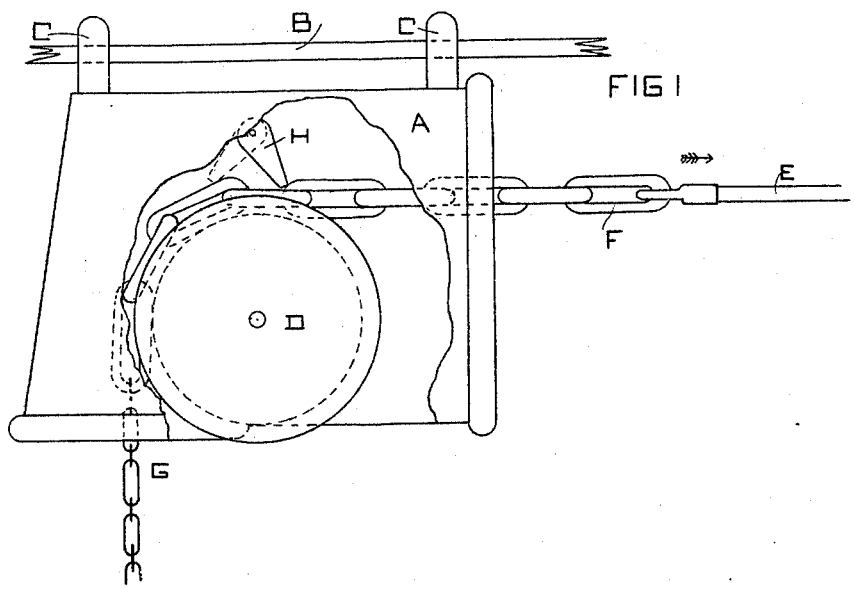
Figure 2:
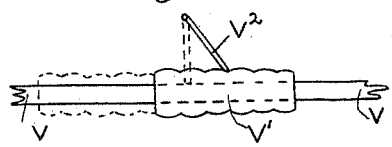

My invention relates to means for automatically securing a suspending or elevating rope or chain at a definite or predetermined point and has for its object to provide convenient means for this purpose and especially such as are used for securing arc lamps. It is illustrated in the accompanying drawings wherein Figure 1 is a side view of a suspending block, pulley, chain and rope certain parts being broken away. Fig. 2 is a detail and diagrammatic view.

Like parts are indicated by the same letter in both the figures.

A is a sleet proof pulley or housing, suspended in any desired manner, as for example on the wire B, by means of the perforated supports C C. Within this housing is the pulley D about which plays the suspending cord or chain as shown in the illustration. This suspending cord or chain is compound, consisting of the rope E, large chain F, and small chain G.

H is a pivoted dog in the upper part of the housing adapted to engage the links of the large chain F but not to engage the rope G or chain E. J is a similar housing suspended on the wire K by means of the perforated supports L L.

M is a pulley and N a cord or rope playing over the same.

O is the enlarged portion secured to the rope and having ratchet surfaces P P.

R is a part depending from the portion O, having substantially the same cross section as the chain N and provided with the eye S with which the object to be raised or lowered is to be secured.

T T are pivoted dogs opposed to the ratchet surfaces P P and adapted to engage the same but of such length as not to engage the rope N or part R and weighted at T' T' so that they are normally always substantially in the position shown in Fig. 2.

V V are portions of the small rope connected by the large rope V'; and V² is a pivoted dog in proximity to such rope. It is evident the same results here sought to be accomplished may be obtained by structures differing more or less from those shown herein and the principles of my invention employed.

The use and operation of my invention are as follows: The housing is of course a mere detail since as shown in Figs. 1 and 2, all that is necessary to realize my invention is a suspending rope, chain or the like, having a large portion with a dog and pulley, the said dog adapted to engage the large portion and thus lock the chain but not to engage the smaller portions. When the rope has been pulled in the direction of the arrow in Fig. 1 far enough to sufficiently lift the object attached to chain G, the enlarged portion F will be in proximity to the dog H and if the rope E is slackened, the dog will engage some link in the chain F and thus support the object without further strain on the lifting rope F. When the object is to be lowered, the rope E will be pulled somewhat farther in the direction indicated by the arrow or until the dog escapes from the chain F. Hereupon if the rope E be slackened the dog H will be swung into the position shown in dotted lines and the object will be free to be lowered. Any of the ordinary stop devices might be used if desired to prevent the object from descending below a desired point. The operation is substantially the same in the case of the device shown in Fig. 2, for here when the parts are as indicated the object attached to the eye S, is suspended without strain on the rope N. By pulling upwardly the dogs will be freed from the part O and when this part has passed entirely above the dogs the object suspended from the eye S may be lowered by loosening the rope N, for the lower end of the part O will engage the extremities of the dogs and force them downwardly so that the part O can slip by when they will be restored to their normal positions.

The operation of the dog upon the enlarged portion of the suspending chain, rope or device, is illustrated in Fig. 2.

I claim:

1. The combination of a movable suspending line with an enlarged portion and a locking dog adapted to hang free from the line proper but to engage the enlarged portion and thus lock the line from motion, and a pulley over which the line passes and to which the dog is opposed.

2. The combination of a suspending line with a locking device, the latter adapted to let the line freely pass and a part connected in such line and adapted to be engaged by the locking device, and a pulley over which the line passes and to which the locking device is opposed.

3. The combination of a pulley with a suspending chain adapted to pass thereover, a locking dog in proximity to said pulley and an enlarged chain portion, said dog adapted to engage such portion but to permit the chain proper to freely pass.

4. The combination of a pulley with a suspending line adapted to pass thereover, a locking dog in proximity to said pulley and an enlarged portion on such line, said dog disposed with reference to the pulley so as to engage the large portion where it is between such dog and pulley but to permit the line proper to freely pass.

JNO. R. FLETCHER.

Witnesses:
S. R. BURNS,
G. W. CHAFFIN.